United States Patent Office 2,981,052
Patented Apr. 25, 1961

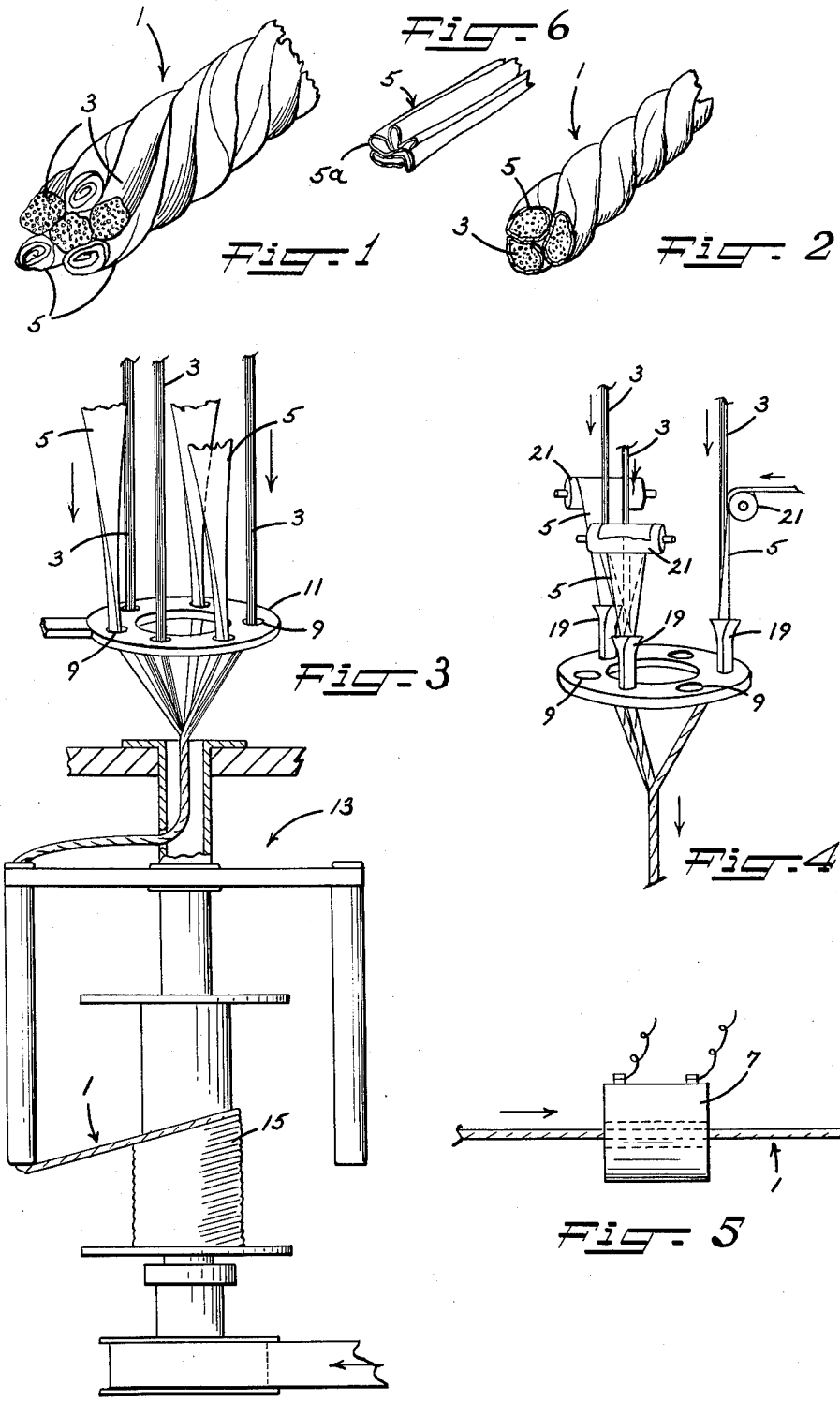

2,981,052
TWINE

Richard MacHenry, Prospect Park, Pa., assignor to American Viscose Corporation, Philadelphia, Pa., a corporation of Delaware Filed Nov. 22, 1957, Ser. No. 698,102

4 Claims. (Cl. 57—154)

The present invention relates to a novel and improved twine which may be used to tie up packages. In particular, the invention relates to a twine for baling multinature masses in which the twine must be tied and knotted while the mass is compressed.

In the past, sisal twine has been principally used for baler twine for holding together harvested crops, such as grain or hay, in a bundle or bale. One main disadvantage of sisal twine is that the diameter of the twine is not uniform along the twine length. Such non-uniformity results in a twine having thick and thin sections. The thin sections of the twine frequently break because of the pressure or force applied thereagainst as the sisal passes through the mechanical knotter of the baler apparatus. In addition, the thin sections of the sisal twine break frequently after the twine has been applied to the hay bundle and before the hay bundle shrinks through drying since the twine is in a tensioned condition because it is tied thereon while the bale is compressed.

The unusually thick portions of the sisal twine are difficult to pass through smaller set clearances of the mechanical knotter and interfere with its operation.

Attempts to substitute continuous filament twine of synthetic resins, viscose and the like have not been successful because the yarns do not form slip-free knots and do not have sufficient bulk to have a high knot strength and to be used in conventional knotter devices.

It is therefore one object of this invention to provide a novel and improved packaging twine which has high tensile strength, uniformity of cross-section and proper bulk for making slip-free knots.

Another object is to provide a high bulk non-slipping twine having a relatively rough surface which will facilitate knot formation.

Another object of this invention is to provide novel methods and apparatus for producing improved twines.

Still another object of this invention is to provide a novel and improved baler twine that overcomes disadvantages found in twines of the prior art.

Other objects and advantages of this invention will become apparent from the following description and drawing wherein:

Figure 1 is an enlarged view of one embodiment of the twine embodying the invention;

Figure 2 is an enlarged view of another form of twine embodying the invention;

Figure 3 is a perspective of apparatus which may be used to form the twine embodying the invention;

Figure 4 is a perspective of a modification of the apparatus of Figure 3;

Figure 5 shows means for simultaneously compressing and applying heat to the finally formed twine; and Figure 6 is an enlarged view of another arrangement of the sheet material in the twine.

In general, the twine of the present invention comprises a plurality of textile strands associated with a plurality of flexible strips of continuous sheet material. In one embodiment, at least some of the textile strands are individually incased with the continuous flexible strips. In another embodiment the strip material is twisted or bunched together to form strands. The textile strands, incased or not in the strip material, are plied or twisted together to form a cord. Where the strip material is twisted to form strands, the textile strands, whether incased in the strip material or not, are plied or twisted with the twisted strip material to form a twine.

The method consists of the steps of simultaneously feeding a plurality of textile or fibrous strands and a plurality of flexible strips of continuous sheet material to a twisting or plying station wherein they are brought into intimate unitary relationship to form a twine. In the case of providing a shroud of the sheet material around each strand, the strip of the flexible material is passed through a scroll-like guiding or shaping surface along with a strand of the yarns whereby the strip is folded around the textile strand so as to incase it.

For the strand there may be used natural, artificial or synthetic staple fibers or continuous filaments such, for example, as fibers or filaments of regenerated cellulose, cellulose derivatives such as cellulose acetate, glass, synthetic resins and the like, including vinyl resin fibers, polyester fibers, polyacrylonitrile fibers, nylon and the like.

For the strip there may be used sheet materials formed of fibrous or non-fibrous materials such, for example, as paper, cellophane, and films formed from cellulose derivatives, such as cellulose acetate, and synthetic resins including nylon, vinyl resins, saran, and polyesters. The strip material may be stretched or slashed to reduce its extensibility before it is plied or associated with the filamentary material.

When cellophane is used for the strip material, the strips may contain no coating whatsoever, a moistureproof coating on one side only of the film, or they may be coated on both sides of the film with suitable moistureproof coatings.

In one preferred embodiment, these strips of cellophane or other strip material are preferably coated with a coating having heat-sealing properties for purposes which will be explained hereinafter.

When uncoated cellophane or other strip material is used, the textile strands of yarn, especially with the embodiment of Figure 1, may have incorporated herein a latent adhesive which may be activated at a later time to effect adhesion between the strands of the final yarn.

The invention is not intended to be limited to those specific types of fibers and sheet materials defined above, but may include numerous other types of fibers, films or paper material.

One embodiment of this invention is shown in Figure 1 of the drawing wherein the twine 1 is formed of separate bundles or strands 3 of continuous filaments or spun yarn of the textile type which are plied together with continuous twisted strips of flexible sheet material 5. The twisted strips of flexible sheet material give a more or less barber-pole effect to the resulting twine.

Another embodiment of the twine as shown in Figure 2 of the drawing wherein the twine 1 consists of three bundles or strands 3 of continuous filaments or spun yarn, each of which are substantially incased in a continuous flexible paper or film strip 5. As seen in Figure 2, the incased strands of continuous filaments or spun yarns are plied or twisted together in intimate relationship. The continuous strips and strand material for the twine of Figure 2 may be formed from the same materials as described with Figure 1.

As mentioned above, each strand is preferably composed of a plurality of either continuous filaments or spun yarns. The preferred make-up of the twine is approximately 50 percent filaments or fibers and 50 percent flexible strip material. Preferably, each strand is formed of four continuous filament yarns wherein each yearn is of 2200 denier with 980 continuous filaments in each yarn. The continuous strips of flexible sheet material are preferably one inch in width. However, the strips may vary in width according to the particular end use desired of the twine. In another embodiment of the invention the same textile strands may be used, with the filaments or fibers comprising 60% of the twine and the strips of sheet material comprising 40%. In this embodiment the sheet material is ¾ inch wide.

There are many advantages inherently found with the use of the present twine as baler twine over the use of the usual sisal baling twine. In the first place, the twine has a greater stiffness. This means that the twine will hold its package form much better than the supple sisal twine. This stiffness feature also minimizes tangling of the yarn during its lacing-up and traveling through the suitable baling and knotting mechanisms.

The strips of flexible material impart increased strength to the twine whereby a twine formed in accordance with this invention has much greater strength than the usual twine formed of twisted strands of natural or artificial yarn.

The use of the strips substantially minimizes abrasion upon the twine by the material being baled. Much of the surface of the twine comprises the continuous paper or film strips which permit the twine to more or less slide across rough-surfaced crops being baled rather than being caught and abraded by the crops being baled. With the use of the present twine, thistles, weeds and all other types of prickly-surfaced vegetation may be easily baled without weakening and breaking the yarn through abrasive forces. The present twine is easier to use in starting up if the knotter mechanism is rusty.

Another advantage of the present twine over the baling twine heretofore used, is that it has a substantially uniform diameter which inherently improves the operation of the baler. Less trouble is encountered when running the twine through the automatic knotting mechanism since the knotter will not have to contend with thick and thin portions of the yarn during the knotting operation. Substantially perfect knots may be continuously tied by the baler for the above reason and also because the twine will slip or slide over the jaws of the knotting and baling mechanism much more easily than sisal. In line with this advantage, the knot strength will also be substantially uniform for all the knots tied which, of course, reduces bale failure. As the strip material increases the diameter of the twine, the knot strength of the twine is increased. The present twine forms an improved twine package that does not collapse and snarl as the twine is unwound, particularly the last several turns of the twine in the package.

The strips of flexible material, especially when cellophane is used, will enhance the type of cut across the yarn after the knotting operation has been completed. With this twine, an extremely clean cut may be expected which prevents ragged, loose ends and unwinding of the strands which make up the yarn.

Another advantage is that scrap cellophane may be used to form the twine.

The twines of Figures 1 and 2 may be used without further conditioning for baling articles as well as for tying up packages of a general nature. With both of the above embodiments, it has been found that when cellophane is used for the strip material, it will retain its deformed condition. In the embodiment of Figure 1, the strips of cellophane will retain their scroll-like or rolled up condition while with Figure 2 the strips will retain their tubular shape incasing the filaments or fibers.

The strips and strands making up the fiber may be adhered or joined together in one way or another. For instance, when the strips of flexible material are cellophane which has a heat-sealable coating, or when other heat-sealable films are used, the twine may be passed through a heating die generally indicated as 7 in Figure 5 of the drawing. The heat, of course, will cause the coating to become soft and tacky and as the components of the yarn are compressed together by the die 7 the components, upon cooling, are more or less welded together to form a strong single filamentary twine.

On the other hand, heat-sealable coatings may be applied to the strands (especially with the embodiment of Figure 1) instead of to the strips of flexible material, or both the strands and the strips may contain heat-sealable materials.

If plain kraft paper or other hydrophilic sheet material is used for the strip material, certain latent adhesive solutions may be applied to the paper before it is incorporated with the strands of textile material after which the twine may be run through a damp atmosphere or other activating means which will activate the adhesive to seal together the components of the twine.

To form the twine, apparatus such as that shown in Figures 3 and 4 of the drawing may be used. As seen in Figure 3, the flexible strips of sheet material 5 are fed to and passed through alternating openings 9, 9 in a ring-shaped guide member 11. As the same time, the textile strands 3, 3, are fed through the remaining openings 9, 9 in the ring guide 11. The strips 5 and the strands 3 are then gathered together and passed through a suitable type plying means or twister 13 which intimately twists together the strips and strands into a unitary twine having a barber-pole surface appearance. The formed twine is then collected upon a suitable take-up bobbin 15.

With the apparatus described above in connection with Figure 3, the twine of Figure 1 may be formed.

Figure 4 shows suitable apparatus for forming the twine described in Figure 2. In this instance, scroll-like or trumpet-type guides 19, 19 having scroll-like or spiral shaped bores are positioned over each hole 9 of the ring guide 11. Each strip 5 of flexible material is fed over a feed roll 21 and into the guide 19 wherein it assumes a shape or more or less conforming to the shape of the guide bore. At the same time a textile strand 3 is fed into the trumpet guide 19 in such a manner that the strip of flexible material wraps itself around the strand 3 as the two elements pass through the trumpet guide 19. As the incased strands 3 emerge from the openings 9, 9 of the ring guide 11, they are gathered together and passed through a twister such as the twister 13 shown in Figure 3 whereupon they become intimately united into a single twine. As before, they are collected upon a suitable take-up bobbin such as the bobbin 15 shown in Figure 3.

The casing effect for the twine of Figure 2 may be that of a split or an overlapped casing. The edges of the strips substantially meet as they are shaped around the textile strands or portions of the sheet material extending along its length may overlap in a rolled up or scroll-like form as shown in Figure 1, depending on the width of the strips.

The strip material 5 may be bunched or crumpled on itself as shown in Figure 6, forming creases, crenulations or folded portions 5a that extend longitudinally of the strip material. The sheet material may be bunched or crumpled around the fibers or filament strands, or the crumpled or bunched sheet material may be plied with the fibers or filament strands to form the twine. The sheet material is somewhat resilient so that the twine may be crushed inwardly where the knot is formed resulting in a hard tight knot that will resist slipping.

It is to be understood that changes and variations may be made without departing from the spirit and scope of the invention as defined in the appended claims.

I claim:

1. A twine especially adapted for binding bales of green hay and the like comprising a plurality of individual bundles of continuous rayon filaments and a plurality of separate, individual continuous strips of flexible sheet material, said bundles and strips being twisted together.

2. A twine as set forth in claim 1 wherein said bundles and strips are bonded together.

3. A twine as set forth in claim 1 wherein said strips of flexible sheet material are cellophane.

4. A twine as set forth in claim 3 wherein said bundles and strips are bonded together.

References Cited in the file of this patent

UNITED STATES PATENTS

| | | |
|---|---|---|
| 451,791 | Williams | May 5, 1891 |
| 523,061 | Williams | July 17, 1894 |
| 1,320,920 | Rice | Nov. 4, 1919 |
| 1,585,616 | Heany | May 18, 1926 |
| 1,585,622 | Heany | May 18, 1926 |
| 1,949,065 | Twitchell | Feb. 27, 1934 |
| 2,021,331 | Sackner | Nov. 19, 1935 |
| 2,161,819 | Katz | June 13, 1939 |
| 2,324,668 | Barnum | July 20, 1943 |
| 2,453,789 | Flater et al. | Nov. 16, 1948 |
| 2,493,559 | Unger | Jan. 3, 1950 |
| 2,671,306 | Slayter | Mar. 9, 1954 |
| 2,707,369 | Pullman | May 3, 1955 |
| 2,856,750 | Lewis | Oct. 21, 1958 |